United States Patent [19]
Becker et al.

[11] 3,719,249
[45] March 6, 1973

[54] POWER STEERING SYSTEM AFFORDING EMERGENCY STEERING CAPABILITY

[75] Inventors: Lanson Becker, Galesburg; Theron M. Huffman, Paw Paw, both of Mich.

[73] Assignee: General Signal Corporation, Rochester, N.Y.

[22] Filed: March 5, 1971

[21] Appl. No.: 121,342

[52] U.S. Cl..............................180/79.2 R, 60/52 S
[51] Int. Cl. .................................................B62d 5/08
[58] Field of Search .......180/79.2 R, 79.2 B; 60/52 S

[56] References Cited

UNITED STATES PATENTS

| | | | |
|---|---|---|---|
| 3,613,818 | 10/1971 | Schubert et al.................180/79.2 R |
| 3,083,533 | 4/1963 | Schenkelberger............180/79.2 R X |
| 3,535,877 | 10/1970 | Becker et al. .........................60/52 S |
| 2,954,671 | 10/1960 | Kress....................................60/52 S |
| 3,249,173 | 5/1966 | Gordon............................180/79.2 R |
| 3,407,894 | 10/1968 | Thompson et al. ..........180/79.2 R X |
| 3,424,262 | 1/1969 | Kunz................................180/79.2 R |
| 3,439,768 | 4/1969 | Medley............................180/79.2 B |

Primary Examiner—Kenneth H. Betts
Assistant Examiner—Leslie J. Paperner
Attorney—Dodge & Ostmann

[57] ABSTRACT

The disclosure concerns hydraulically operated power steering systems for vehicles, particularly large articulated vehicles. The system includes a closed center steering valve which normally is supplied with oil from an engine driven pump, and it incorporates an accumulator and a ground drive pump which provide sufficient hydraulic power to permit steering during extended periods of engine-off towing.

7 Claims, 4 Drawing Figures

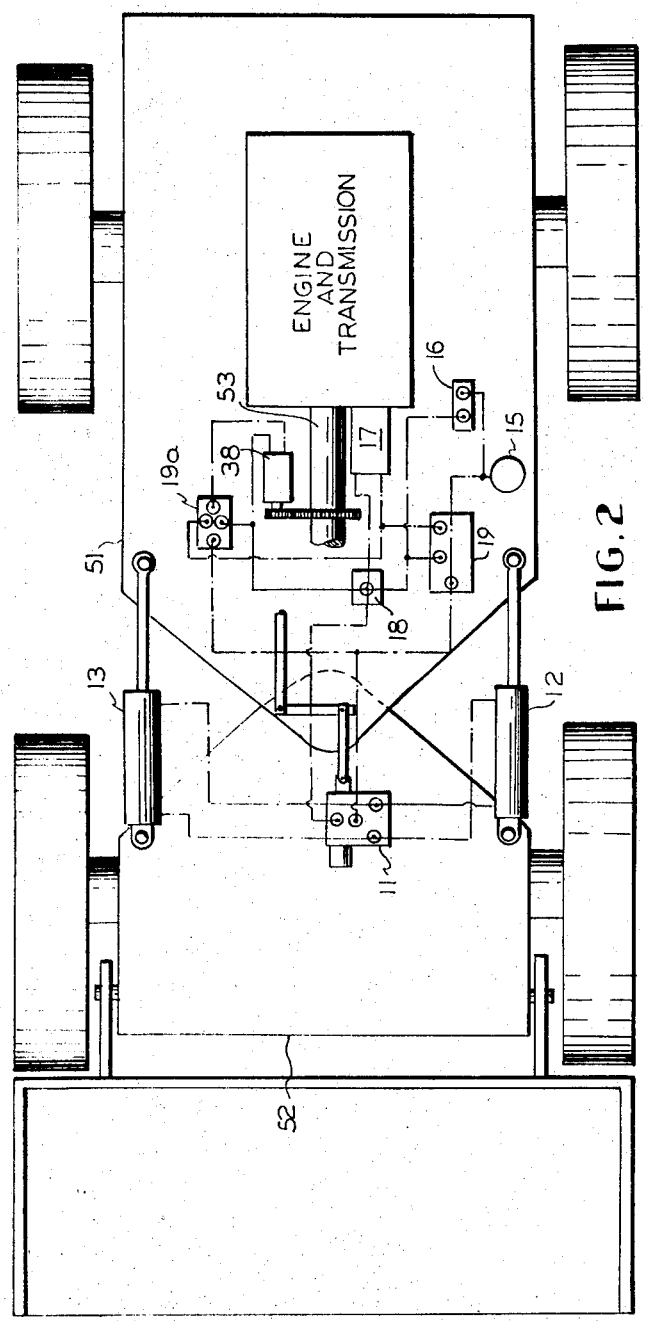
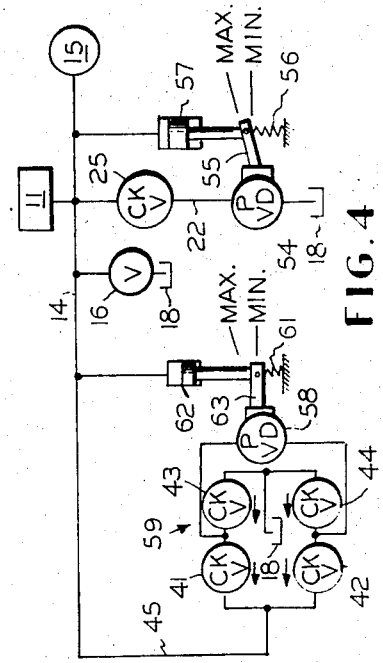
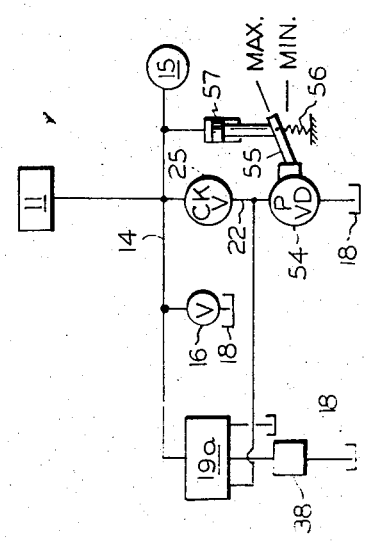
FIG. 2
FIG. 4
FIG. 3
INVENTORS
LANSON BECKER
THERON M. HUFFMAN
ATTORNEYS 3,719,249

POWER STEERING SYSTEM AFFORDING EMERGENCY STEERING CAPABILITY

BACKGROUND AND SUMMARY OF THE INVENTION

Steering of large articulated vehicles, such as front end loaders, trucks and scrapers, normally is effected exclusively through a hydraulically operated power steering system. The system is supplied by a pump driven by the propulsion engine of the vehicle and, therefore, when the engine stops or the pump fails, all steering capability is lost. This condition can produce disastrous consequences if the vehicle is in motion, so the problem of providing emergency steering capability is receiving considerable attention.

Various solutions to this safety problem have been offered but, as far as we are aware, each of them leaves something to be desired. For example, in the most common case wherein the system employs an open center steering valve, it is proposed to incorporate an auxiliary pump driven either by the vehicle wheels (termed a ground drive pump) or by an electric motor. The ground drive pump is acceptable at medium to high roading speeds, but, since its rate of discharge varies directly with vehicle speed, it affords very slow steering response at low speeds. The second alternative, on the other hand, is generally unacceptable because it is impractical to provide an electric drive motor capable of meeting the horsepower requirements of a high flow open center system. Another, and probably the best, prior solution to the steering safety problem consists in using a closed center steering valve which is provided with a supply circuit containing an accumulator. In this scheme, the accumulator is charged by the steering pump and is maintained in that condition while the engine is running; therefore, a limited amount of oil under pressure always is available for emergency steering purposes whenever the engine stops or the pump fails, regardless of vehicle speed. And, the scheme is simple and relatively inexpensive. However, since the capacity of the accumulator is inherently limited by practical considerations, the proposal does not provide steering capability during long range towing operations.

The object of this invention is to provide an improved steering system which affords limited steering capability under all emergency conditions and throughout extended towing operations. The new system is of the closed center type and incorporates both an accumulator and a ground drive pump. The two pumps are provided with delivery controls which respond to the pressure in the supply circuit of the steering valve, and which operate in sequence so that hunting is avoided and the ground drive pump consumes little energy when the main pump is running. Under normal operating conditions, the main or engine driven pump supplies the demands of the steering circuit and keeps the accumulator charged. Therefore, if this pump fails or the engine stops, the oil stored under pressure in the accumulator will be available for immediate use in the steering circuit should a steering correction be necessary. Moreover, when emergency steering is initiated and accumulator pressure drops into the control range of the ground drive pump, this pump will become effective to deliver oil to the steering circuit and maintain supply pressure at a lower, but still adequate, operating level. And, since this pressure-maintaining action of the ground drive pump continues as long as the vehicle is moving, the new system provides limited steering capability throughout towing operations of unlimited duration.

In accordance with usual operating procedure, the operator should allow the vehicle to remain at rest for a short warm-up period after the engine is first started. During this time, the main pump will be able to charge the accumulator to the normal high pressure level, and thereby cause the controls to either unload the ground drive pump or reduce its displacement to a minimum, depending upon whether that pump is of the fixed or variable delivery type. However, if this standard procedure is not followed, the ground drive pump will be subjected to relatively high pressures while it is running at a low speed. This high load-low speed condition can cause seizure of the ground drive pump in cases where that pump employs bearings of the plain bushing type which rely upon a hydrodynamic oil film to support the load. Therefore, in order to eliminate this possibility, the preferred version of the invention incorporates apparatus for unloading the ground drive pump whenever the discharge pressure of the main pump is above a level which is just high enough to indicate that the main pump is operating normally. This arrangement insures that the ground drive pump will not be subjected unnecessarily to potentially harmful operating conditions.

BRIEF DESCRIPTION OF THE DRAWINGS

Several embodiments of the invention are described herein with reference to the accompanying drawings in which:

FIG. 2 is plan view, in schematic form, of a representative articulated loader showing the locations of the hydraulic components in the FIG. 1 system.

FIGS. 3 and 4 are schematic diagrams of two alternative embodiments of the invention.

DESCRIPTION OF THE EMBODIMENT OF FIGS. 1 AND 2

Figure 1:
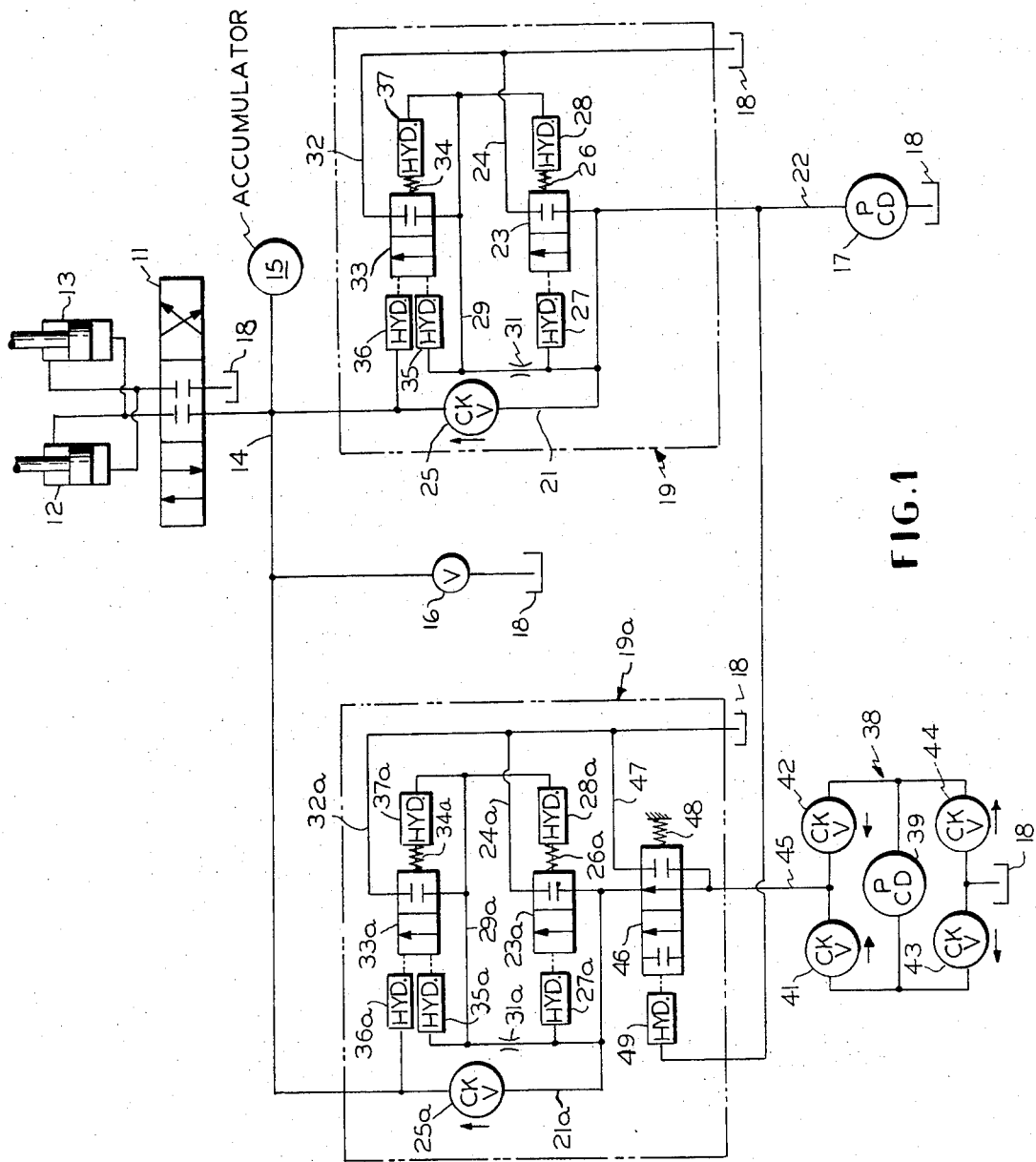
FIG. 1 is a schematic diagram of the preferred hydraulic system.

Referring to FIG. 1, the improved system includes a closed center steering valve 11 which controls the flow of hydraulic fluid to and from a pair of double-acting steering cylinders 12 and 13, and which is provided with a supply circuit 14 containing a gas charged accumulator 15. Preferably, the accumulator has a capacity sufficient to supply the flow demand of cylinders 12 and 13 during at least the maximum steering corrections (i.e., pivoting of the vehicle halves through an angle of 180°). As a safety measure, the supply circuit 14 is provided with a vent valve 16 which can be opened, for example, as an incident to turning off the ignition switch, to bleed off accumulator pressure when the vehicle is parked. This insures against injury in the event someone turns the steering wheel.

Supply circuit 14 normally receives oil under pressure from a fixed displacement, engine driven pump 17 which draws the fluid from a reservoir or tank 18 and delivers it to the circuit through an unloader 19. The illustrated unloader, which is described in U.S. Pat. No. 3,535,877, granted Oct. 27, 1970, comprises a through passage 21 leading from the discharge line 22 of pump 17 to circuit 14, an unloading valve 23 arranged to open and close an exhaust passage 24 interconnecting passage 21 and tank 18, and a check valve 25 which is interposed in passage 21 and oriented to prevent escape of oil from circuit 14 at times when valve 23 is in unloading position or pump 17 is inactive or disabled. Unloading valve 23 is biased to the illustrated loading position by spring 26 and is actuated by a pair of opposed fluid pressure motors 27 and 28. Motor 27, which urges the valve to unloading position, is connected with passage 21 and responds continuously to the pressure upstream of check valve 25, whereas motor 28 is subjected to pressures developed by a piloting apparatus which responds to the pressure in supply circuit 14. This apparatus includes a pilot passage 29 which interconnects motor 28 and passage 21 and contains a flow restrictor 31, and a second pilot passage 32 which leads from motor 28 to tank 18 and is controlled by a pilot valve 33. The pilot valve is biased closed by spring 34 and is opened by a motor 35 which responds to the pressure in pilot passage 29. Since this pressure is essentially the same as the pressure in circuit 14, it will be evident that pilot valve 33 opens when the pressure in the supply circuit reaches a predetermined level. And, since passage 29 is restricted, it also will be evident that opening of valve 33 will unbalance the pressures applied to motors 27 and 28, and thereby enable motor 27 to shift valve 23 to unloading position. After valve 33 has been opened, it is held in that position by a fluid pressure motor having opposing portions 36 and 37 which respond, respectively, to the pressures in circuit 14 and in pilot passage 29. The motor portions 36 and 37 have equal effective areas and are subjected to equal pressures when pilot valve 33 is closed; therefore, they have no effect upon the opening movement of that valve. However, when valve 33 opens, it dissipates the pressure in motor portion 37, and thereby renders portion 36 effective. Motor portion 36 has a greater effective area than motor 35, so the supply circuit pressure at which valve 33 closes will be materially lower than the pressure at which it opened. This differential is necessary in order to make unloader 19 stable, and commonly in on the order of 15 percent of the maximum pressure. Thus, if it is assumed that the accumulator 15 in the illustrated system is to be charged to a maximum pressure of 3,000 p.s.i., motor 35 will open valve 33 at that pressure, and motor portion 36 will hold the valve open until supply circuit pressure decreases to 2,550 p.s.i.

Under emergency conditions, the supply circuit 14 of steering valve 11 receives fluid under pressure from an auxiliary pumping unit 38 with which it is connected through an unloader 19a. The auxiliary unit 38 includes a fixed displacement ground drive pump 39 and four check valves 41–44 which are arranged to insure that the pump always discharges to line 45 regardless of the fact that the direction of flow through the pump itself changes with the direction of movement of the vehicle. Unloader 19a includes counterparts of all of the components in unloader 19, but, to avoid hunting, it is designed to operate in a lower pressure range. In the illustrated case, wherein the operating range of unloader 19 is between 2,550 and 3,000 p.s.i., the pilot valve 33a of unloader 19a would be set to open at a pressure on the order of 2,100 p.s.i. and to close at a pressure of about 1,785 p.s.i.

The illustrated unloader 19a also incorporates a secondary unloading valve 46 which controls an exhaust passage 47 leading from discharge line 45 to tank 18. This valve is biased to the illustrated loading position, in which it blocks flow through passage 47, by a spring 48, and is shifted to open position by a fluid pressure motor 49 which responds to the pressure in the discharge line 22 of main pump 17. These components are so designed that the secondary unloading valve 46 is kept in the open or unloading position whenever the pressure in line 22 is above a level (e.g. 100 p.s.i.) which is just high enough to indicate that main pump 17 is operating normally. In this way, the system insures that pump 39 normally will not be subjected to high pressures when it is running at a low speed, and thereby minimizes the risk of seizure in cases where the pump incorporates plain bushings. Of course, pump 39 will encounter the potentially harmful high pressure-low speed condition during emergency steering operations, but then the risk of pump damage is justified by the increased steering safety which the inclusion of pumping unit 38 affords.

On a typical articulated loader, the components of the steering system would be arranged as shown in FIG. 2. Since the engine and the operator's cab of this vehicle are located on the rear half 51, steering valve 11 is the only component of the steering system carried by the front half 52. It also will be observed that, while main pump 17 is driven directly by the engine, the pump of auxiliary unit 38 is driven by the final drive shaft 53 leading from the engine-transmission unit to the front wheels.

When the vehicle is in service and the engine is running, the pressure in the discharge line 22 of main pump 17 will be above the setting of the secondary unloading valve 46. Therefore, valve 46 will maintain exhaust passage 47 open and thus preclude loading of ground drive pump 39. The oil discharged by pump 17 is delivered to supply circuit 14 through line 22 and passage 21, and, as accumulator 15 is charged, the pressure in that circuit will rise. When the pressure reaches the desired maximum of 3,000 p.s.i., motor 35 will shift pilot valve 33 to the open position, thereby venting motor 28 and allowing motor 27 to shift valve 23 to the unloading position. Now, the output of pump 17 is bypassed directly to tank 18 through exhaust passage 24. Although the pressure in discharge line 22 decreases drastically when valve 23 shifts, the flow rate through the unloading path is high enough (e.g. 50 GPM) to maintain a backpressure sufficient to prevent shifting of secondary unloading valve 46.

During steering maneuvers, the pressure in supply circuit 14 will decrease as oil is transferred from accumulator 15 to the cylinders 12 and 13, and eventually it will reach the 2,550 p.s.i. lower limit of unloader 19. At this time, spring 34 will close pilot valve 33 and effect equalization of the pressures in motors 27 and 28. As a result, spring 26 will shift valve 23 to loading position, and pump 17 will again deliver oil to circuit 14 and effect recharging of accumulator 15.

As long as main pump 17 is operating normally, the pressures in circuit 14 and discharge line 22 will remain above 2,550 and 100 p.s.i., respectively. Consequently, pilot valve 33a will be in open position, and both of the unloading valves 23a and 46 will be in unloading position. As a result, pump 39 is unloaded and consumes little energy.

If the engine stops, or pump 17 or its discharge line fails, the pressure in line 22 will decrease below the 100 p.s.i. setting of valve 46, and spring 48 will immediately move the latter to the illustrated loading position. However, since supply circuit 14 is at a pressure of at least 2,550 p.s.i., the ground drive pump will now be unloaded by valve 23a. This situation will continue until, as a result of steering corrections, the pressure in supply circuit 14 decreases to 1,785 p.s.i. At that time, spring 34a will close valve 33a, to thereby equalize the pressures in motors 27a and 28a and allow spring 26a to shift valve 23a to loading position. Auxiliary pumping unit 38 will now deliver oil to circuit 14 and recharge accumulator 15. When circuit pressure is restored to 2,100 p.s.i., valve 33a will reopen, and valve 23a will again unload pump 39. The ground drive pump will continue to supply oil to circuit 14 as needed to maintain circuit pressure between 1,785 and 2,100 p.s.i. as long as the vehicle continues to move at a medium speed, and therefore steering capability is afforded even in cases where the vehicle is towed over long distances. And, when vehicle speed reduces to the level at which pump 39 is no longer effective, accumulator 15 is available to provide the oil which may be needed for steering as the vehicle comes to rest.

Although, during the emergency period, the maximum pressure available for steering purposes in the illustrated embodiment is only 70 percent of the maximum pressure during normal operation, this level is adequate for safe control of the vehicle. Moreover, the stated difference between the normal and emergency pressure levels is sufficient to guarantee that unloader 19a will not hunt, i.e., shift between the loading and unloading state, during normal operation even though the system components are made using normal manufacturing tolerances.

DESCRIPTION OF THE EMBODIMENTS OF FIGS. 3 AND 4

At the present time, the FIG. 1 system is the preferred embodiment of the invention primarily because of its relatively low cost. However, it should be understood that the invention can be practiced using a pressure compensated, variable delivery pump in place of either fixed displacement pump and its associated unloader. Two of the possible alternatives are illustrated in FIGS. 3 and 4.

In the FIG. 3 system, only main pump 54 is of the variable delivery type. The delivery control element 55 of this unit is equipped with a pressure compensator represented by a spring 56 which urges the element to maximum delivery position, and a pressure motor 57 which responds to the pressure in supply circuit 14 and serves to shift element 55 toward the zero or minimum delivery position. The compensator is designed to operate in the same pressure range as the unloader 19 of FIG. 1, but, in contrast to the on-off action of an unloader, the compensator affords a progressive change in the rate at which the pump delivers oil to circuit 14 as circuit pressure varies between 2,550 p.s.i. and 3,000 p.s.i.

In the FIG. 4 system, both pumps are of the variable delivery type; the ground drive pump 58 of auxiliary pumping unit 59 being provided with a compensator 61, 62 which progressively changes the setting of delivery control element 63 as the pressure in circuit 14 varies between the 1,785 and 2,100 p.s.i. control limits used for the unloader 19a of FIG. 1. Since the check valves 41 and 42 in the reversing circuit for pump 58 inherently isolate the pump from circuit 14 during normal operation, the discharge line 45 need not be provided with the check valve 25a used in the first embodiment. This line, however, may be equipped with the secondary unloader 46 if pump 58 requires protection against the high pressure-low speed operating condition.

We claim:

1. A hydraulically operated power steering system for a wheeled vehicle having a propulsion engine comprising
   a. a closed center steering valve (11) for controlling the flow of fluid to and from steering motor means (12, 13) and having a supply circuit (14) containing an accumulator (15) for storing fluid under pressure;
   b. a main pumping unit (17 or 54) driven by the engine and connected to deliver fluid to the supply circuit (14) through check valve means (25) which prevents reverse flow from the circuit;
   c. an auxiliary pumping unit (38 or 59) connected with at least one of the wheels of the vehicle so that it is driven when the vehicle is in motion, this pumping unit also being connected to deliver fluid to the supply circuit (14) through check valve means (25a or 41, 42) which prevents reverse flow from the circuit;
   d. first control means (19 or 56, 57) responsive to the pressure in the supply circuit (14) and effective when the main pumping unit (17 or 54) is running for causing that unit to deliver fluid to the supply circuit as needed to maintain said pressure above a first level; and
   e. second control means (19a or 61, 62) responsive to the pressure in the supply circuit (14) and effective when the auxiliary pumping unit (38 or 59) is running for causing that unit to deliver fluid to the supply circuit as needed to maintain said pressure above a second level lower than said first level.

2. A steering system as defined in claim 1 including an unloading valve (46) which responds to the discharge pressure of the main pumping unit (17 or 54) and opens an exhaust path (47) leading from the auxiliary pumping unit to a reservoir (18) when said pressure rises above a level which is considerably lower than said second level.

3. A steering system as defined in claim 1 in which
   a. each pumping unit includes a fixed delivery pump (17 or 39);
   b. the first control means (19) comprises an unloading valve (23) which controls an exhaust path (24) leading from the main pump (17) to a reservoir (18), the valve serving to close said path when supply circuit pressure decreases to said first level and to open said path when supply circuit pressure rises to a higher third level; and
   c. the second control means (19a) comprises a second unloading valve (23a) which controls an exhaust path (24a) leading from the auxiliary pump (39) to said reservoir (18), this valve serving to close said exhaust path when supply circuit pressure decreases to said second level and to open said path when supply circuit pressure rises to a fourth level intermediate said first and second levels.

4. A steering system as defined in claim 1 in which
a. the auxiliary pumping unit (38) includes a fixed delivery pump (39); and
b. the second control means (19a) comprises an unloading valve (23a) which controls an exhaust path (24a) leading from the auxiliary pump to a reservoir (18),
c. the unloading valve serving to close said exhaust path when supply circuit pressure decreases to said second level and to open said exhaust path when the supply circuit pressure rises to a third level intermediate the first and second levels.

5. A steering system as defined in claim 4 including a second unloading valve (46) which responds to the discharge pressure of the main pumping unit (17 or 54) and opens a second exhaust path (47) leading from said fixed delivery pump to said reservoir (18) when said pressure rises above a fourth level which is considerably lower than said second level.

6. A steering system as defined in claim 1 in which
a. the main pumping unit includes a variable delivery pump (54); and
b. the first control means (56, 57) is a delivery control device for the main pump which serves to progressively decrease delivery rate to a minimum as circuit pressure rises from said first level to a maximum level and to progressively increase delivery rate to a maximum as said pressure decreases from said maximum level to said first level.

7. A steering system as defined in claim 6 in which
a. the auxiliary pumping unit (59) includes a variable delivery pump (58); and
b. the second control means (61, 62) is a delivery control device for the auxiliary pump which serves to progressively decrease its delivery rate to a minimum as circuit pressure rises from said second level to a third level intermediate the first and second levels, and to progressively increase its delivery rate to a maximum as said pressure decreases from the third level to said second level.

* * * * *